United States Patent
Nolen et al.

[11] Patent Number: 6,055,766
[45] Date of Patent: May 2, 2000

[54] APPARATUS FOR ATTRACTING AND DESTROYING INSECTS

[75] Inventors: James A. Nolen, West Greenwich, R.I.; David L. Mathieu, Middletown, Conn.; Daniel Kline, Gainesville, Fla.

[73] Assignees: Biosensory Insect Control Corporation, Willimantic, Conn.; United States of America, Washington, D.C.

[21] Appl. No.: 09/148,550

[22] Filed: Sep. 2, 1998

Related U.S. Application Data

[63] Continuation-in-part of application No. 08/695,368, Aug. 9, 1996, abandoned.

[51] Int. Cl.⁷ ..................................................... A01M 1/22
[52] U.S. Cl. ............................................................ 43/112
[58] Field of Search ............................... 43/112, 113, 107

[56] References Cited

U.S. PATENT DOCUMENTS

| | | |
|---|---|---|
| 2,106,528 | 1/1938 | Jones et al. |
| 2,661,512 | 12/1953 | Kretschmar .................. 43/112 |
| 3,187,458 | 6/1965 | Densmore . |
| 3,835,577 | 9/1974 | Soulos . |
| 3,894,352 | 7/1975 | Iannini . |
| 3,950,886 | 4/1976 | Newhall . |
| 4,121,371 | 10/1978 | Kaphengst . |
| 4,158,268 | 6/1979 | DeYoreo . |
| 4,182,069 | 1/1980 | De Yoreo . |
| 4,387,529 | 6/1983 | Hedstrom . |
| 4,454,677 | 6/1984 | Chuang . |
| 4,486,974 | 12/1984 | Yavineli . |
| 4,523,404 | 6/1985 | De Yoreo . |
| 4,689,915 | 9/1987 | Grothaus . |
| 4,696,126 | 9/1987 | Grothaus . |
| 4,794,228 | 12/1988 | Braun . |
| 4,852,296 | 8/1989 | Swamson . |
| 4,891,904 | 1/1990 | Tabita . |
| 4,907,365 | 3/1990 | Conigliaro, Jr. . |
| 4,907,366 | 3/1990 | Balfour . |
| 4,951,414 | 8/1990 | Mewissen . |
| 4,962,611 | 10/1990 | Millard ........................ 43/112 |
| 5,020,270 | 6/1991 | Lo . |
| 5,205,064 | 4/1993 | Nolen ......................... 43/112 |
| 5,231,790 | 8/1993 | Dryden ....................... 43/113 |
| 5,241,779 | 9/1993 | Lee . |
| 5,255,468 | 10/1993 | Chesire . |
| 5,301,458 | 4/1994 | De Yoreo . |
| 5,595,018 | 1/1997 | Wilbanks . |
| 5,657,576 | 8/1997 | Nicosia ...................... 43/132.1 |
| 5,799,436 | 9/1998 | Nolen ......................... 43/112 |

FOREIGN PATENT DOCUMENTS

| | | |
|---|---|---|
| WO 92/17060 | 10/1992 | Australia . |
| PCT/AU92/00137 | 10/1992 | WIPO . |

*Primary Examiner*—Jack W. Lavinder
*Attorney, Agent, or Firm*—Salter & Michaelson

[57] ABSTRACT

An apparatus for attracting and destroying insects is disclosed. The apparatus simulates a host animal and has an electrified grid constructed and arranged for intercepting the flight of the insect around the apparatus, thereby increasing the efficiency of the apparatus in destroying insects. The apparatus generally includes a source of carbon dioxide, a source of octenol, a device for emitting the carbon dioxide proximate the source of octenol to create a mixture of the carbon dioxide and octenol, a heating element and an electrified grid. Insects are initially attracted to the apparatus by the odor associated with the mixture of carbon dioxide and octenol. As the insects fly closer to the apparatus, they are further attracted to the visual properties of the apparatus and then, at close range, they are attracted to the heat emitted by the heating element. In an attempt to fly closer to the heating element, the insects are intercepted by the electrified grid and destroyed.

24 Claims, 6 Drawing Sheets

APPARATUS FOR ATTRACTING AND DESTROYING INSECTS

REFERENCE TO RELATED APPLICATION

This application is a Continuation-in-Part of U.S. Ser. No. 08/695,368, filed on Aug. 9, 1996, now abandoned.

BACKGROUND OF THE INVENTION

1. Field of the Invention

The present invention relates generally to apparatuses for attracting and destroying insects, and more particularly to an apparatus having a novel electric grid which is designed to effectively destroy insects, especially mosquitoes, biting flies and midges.

2. Discussion of the Prior Art

Devices for attracting and destroying insects are well-known in the art. For example, U.S. Pat. No. 2,106,528 to Jones et al., U.S. Pat. No. 3,187,458 to Densmore, U.S. Pat. No. 3,835,577 to Soulos, U.S. Pat. No. 3,894,351 to Iannini, U.S. Pat. No. 4,182,069 to DeYoreo, and U.S. Pat. No. 4,387,529 to Hedstrom are representative of the available prior art devices used to attract and destroy insects. The patent to Densmore discloses a device which employs a light for attracting insects and a pesticide saturated mesh surrounding the light for killing the insects attempting to reach the light source. The remaining patents to Jones et al., Soulos, Iannini, DeYoreo and Hedstrom disclose various devices which employ an illuminating and/or odor dispensing mechanism for attracting insects, and an electrified screen grid for electrocuting insects attempting to reach the light or pheromone.

Although the electric "bug zapping" devices are popular with consumers, they have certain shortcomings. For example, the devices employing an ultraviolet light source are effective for attracting and destroying beneficial insects but are ineffective for attracting biting insects, such as mosquitoes and flies, that prey on humans and livestock. The prior art devices which utilize pheromones as the odor source to attract specific types of insects are expensive because the pheromone source is continuously active and therefore must constantly be replaced.

One solution to the foregoing problems is provided in U.S. Pat. No. 5,205,064 to Nolen, which patent is hereby incorporated by reference in its entirety. This patent discloses a device having a pressurized canister charged with carbon dioxide, octenol, or both, or with insect pheromones. The device further has an infrared and/or ultraviolet light source which is surrounded by an electric grid.

There is presently a need for an apparatus capable of simulating a host animal and having an electrified grid constructed and arranged for intercepting the flight of the insect around the apparatus, thereby increasing the efficiency of the apparatus in destroying insects.

SUMMARY OF THE INVENTION

The present invention provides an apparatus which simulates a host animal and has an electrified grid constructed and arranged for intercepting the flight of the insect around the apparatus, thereby increasing the efficiency of the apparatus in destroying insects. The apparatus generally includes a source of carbon dioxide, a source of octenol, a device for emitting the carbon dioxide proximate the source of octenol to create a mixture of the carbon dioxide and octenol, a heating element and an electrified grid. Insects are initially attracted to the apparatus by the odor associated with the mixture of carbon dioxide and octenol. As the insects fly closer to the apparatus, they are further attracted to the visual properties of the apparatus and then, at close range, they are attracted to the heat emitted by the heating element. In an attempt to fly closer to the heating element, the insects are intercepted by the electrified grid and destroyed.

According to one embodiment of the present invention, an apparatus for attracting and destroying insects is disclosed, comprising a source of an insect attractant, a heating device for heating the insect attractant, a source of carbon dioxide, a device for emitting the carbon dioxide proximate the insect attractant source, a device for destroying insects surrounding the sources of insect attractant and carbon dioxide and a device for controlling the heating device, the emitting device and the destroying device.

According to another embodiment of the invention, a method of attracting and destroying insects is disclosed, the method comprising the steps of emitting carbon dioxide to create a carbon dioxide plume, heating an insect attractant proximate the carbon dioxide plume to create a mixture of carbon dioxide and the insect attractant; and electrocuting insects as they fly toward the mixture.

According to another embodiment of the invention, an apparatus for attracting and destroying insects is disclosed, comprising a source of carbon dioxide, a source of octenol, a heater disposed adjacent the source of octenol, for heating the octenol, a valve for emitting an amount of the carbon dioxide proximate the octenol and a grid surrounding the source of carbon dioxide, the source of octenol and the heater, the grid receiving an electrical charge.

According to yet another embodiment of the invention, an apparatus for attracting and destroying insects is disclosed, comprising a first source of an insect attractant, a second source of an insect attractant, a source of carbon dioxide, a device for emitting the carbon dioxide proximate the first and second sources of insect attractant, a device for destroying insects surrounding the first and second sources of insect attractant and the source of carbon dioxide and a control device for controlling the emitting device and the destroying device.

BRIEF DESCRIPTION OF THE DRAWINGS

The invention will be described with reference to the appended drawings, in which.

DETAILED DESCRIPTION OF THE PREFERRED EMBODIMENT

Research by the inventors in the field of entomology has shown that biting insects such as midges, mosquitos and biting flies employ predictable behavior when searching for blood hosts. Specifically, these biting insects are initially attracted by the odor of kairomones, which are chemicals given off by blood hosts and which are attractants to biting insects. Kairomones include carbon dioxide exhaled by both mammalian and avian blood hosts and octenol, an alcohol which is given off by mammalian blood hosts. Mosquitos and biting flies can detect the odor of carbon dioxide exhaled by a blood host at a distance of approximately 90 meters. It has been found that biting insects strongly respond to the respiration characteristics of small mammals, such as rabbits, which exhale approximately fifty cubic centimeters of carbon dioxide every five seconds. Biting insects locate a blood host by tracking the carbon dioxide plume created by the blood host. A mixture of carbon dioxide and octenol is particularly attractive to insects seeking mammalian blood hosts.

At a range of approximately 10 meters, mosquitos and biting flies are able to obtain visual contact with a blood host. Research has found that mosquitos are most attracted to small, black cylindrical objects similar in physical dimensions and surface area to the body of a small animal such as a rabbit. Biting flies are most attracted to larger black cylindrical objects. Insects stay within the carbon dioxide plume as they approach within visual range of a target.

At a distance of approximately 3 meters in dry weather (9 meters in humid weather), biting insects can detect a blood host's thermal emissions. Thermal emissions can be measured as surface temperature measured in degrees, infrared light emissions measured in wavelengths or energy dissipated measured in watts per unit area. When the insects are in close range and detect thermal radiation, they circle the host to determine the characteristics of the host based on the detected thermal radiation.

Mosquitos and biting flies respond to a narrow range of temperature. Research has shown that a temperature of approximately 110° F.±15° F. is optimal to attract species seeking mammalian blood hosts. Temperatures below this range do not attract these insects and temperatures above this range actually repel these insects. Since the pattern of surface temperature is dictated by the distribution of blood near the surface of the skin, an important characteristic of surface temperature of a mammalian blood host is the pattern of warmer and cooler areas on the surface of the blood host. Mosquitos and biting flies are most attracted to an irregular surface temperature pattern having approximately 50% to 70% of the surface at approximately 110° F. and the balance of the surface at a cooler temperature, but not less than approximately 95° F.

Infrared radiation emitted by warm-blooded animals is similar to black body radiation emitted by an object as it cools, i.e., it consists of incoherent light of all wavelengths. Since warm-blooded animals maintain their body temperatures within narrow ranges, they tend to emit infrared light of certain predictable wavelengths. It is believed that when insects and blood hosts evolve together in the same ecosystem, the insects' antennae receptors become tuned to the wavelengths of the infrared light emitted by certain blood hosts.

Regarding the measurement of energy dissipation, it has been found that mosquito species known to prefer avian blood hosts are attracted to a host's energy dissipation of approximately 0.1 watts per square inch. Mosquito species and biting flies known to prefer mammalian blood hosts are most attracted to a host's energy dissipation in a range of approximately 0.1 to 0.2 watts per square inch.

Referring now to the drawings, there is generally indicated at 10 an apparatus of the present invention for attracting and destroying insects. The apparatus 10 is operable for attracting and destroying a variety of insects including mosquitos, biting flies and midges which prey on warm-blooded animals, such as humans and livestock. As shown, the apparatus 10 comprises a housing, generally indicated at 12, a pressurized canister, generally indicated at 14, a source of octenol, generally indicated at 16, a heat source, generally indicated at 18, and an electric grid, generally indicated at 20. These components of the apparatus 10 operate together to effectively and efficiently attract and destroy insects.

Figure 1:
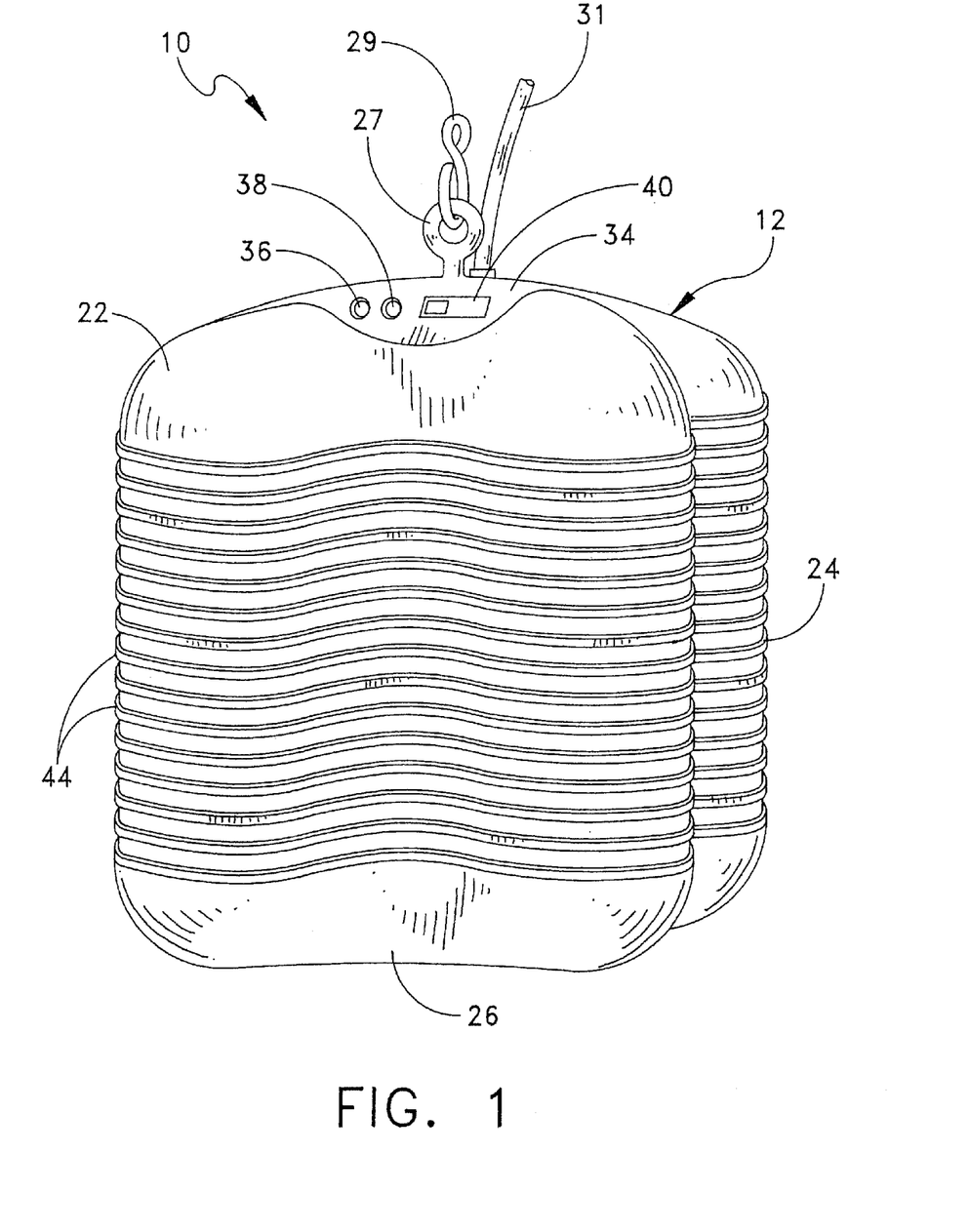
FIG. 1 is a perspective view of the apparatus of the present invention.
Figure 2:
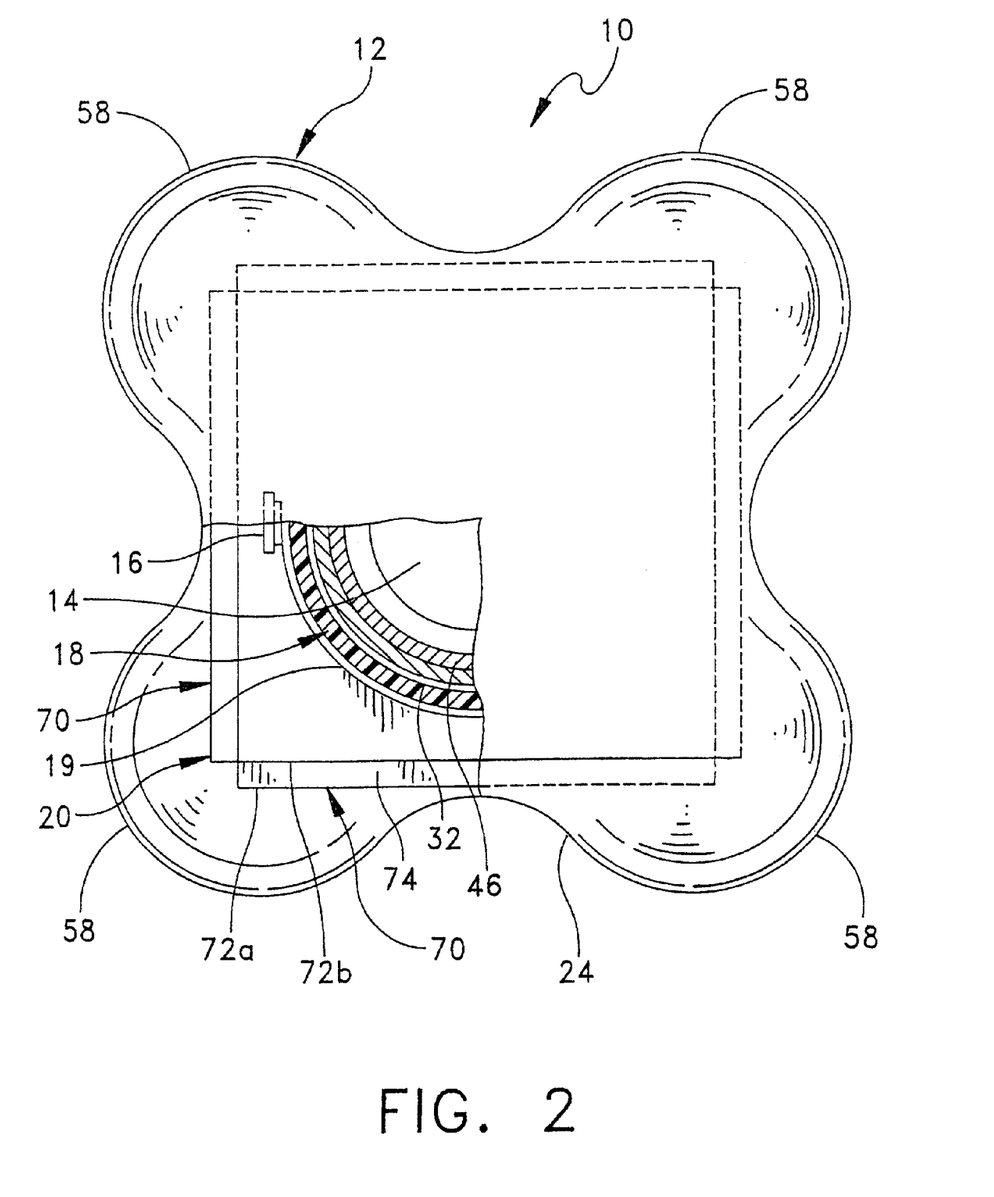
FIG. 2 is a partially cut-away bottom plan view of the apparatus of the present invention.
Figure 3:
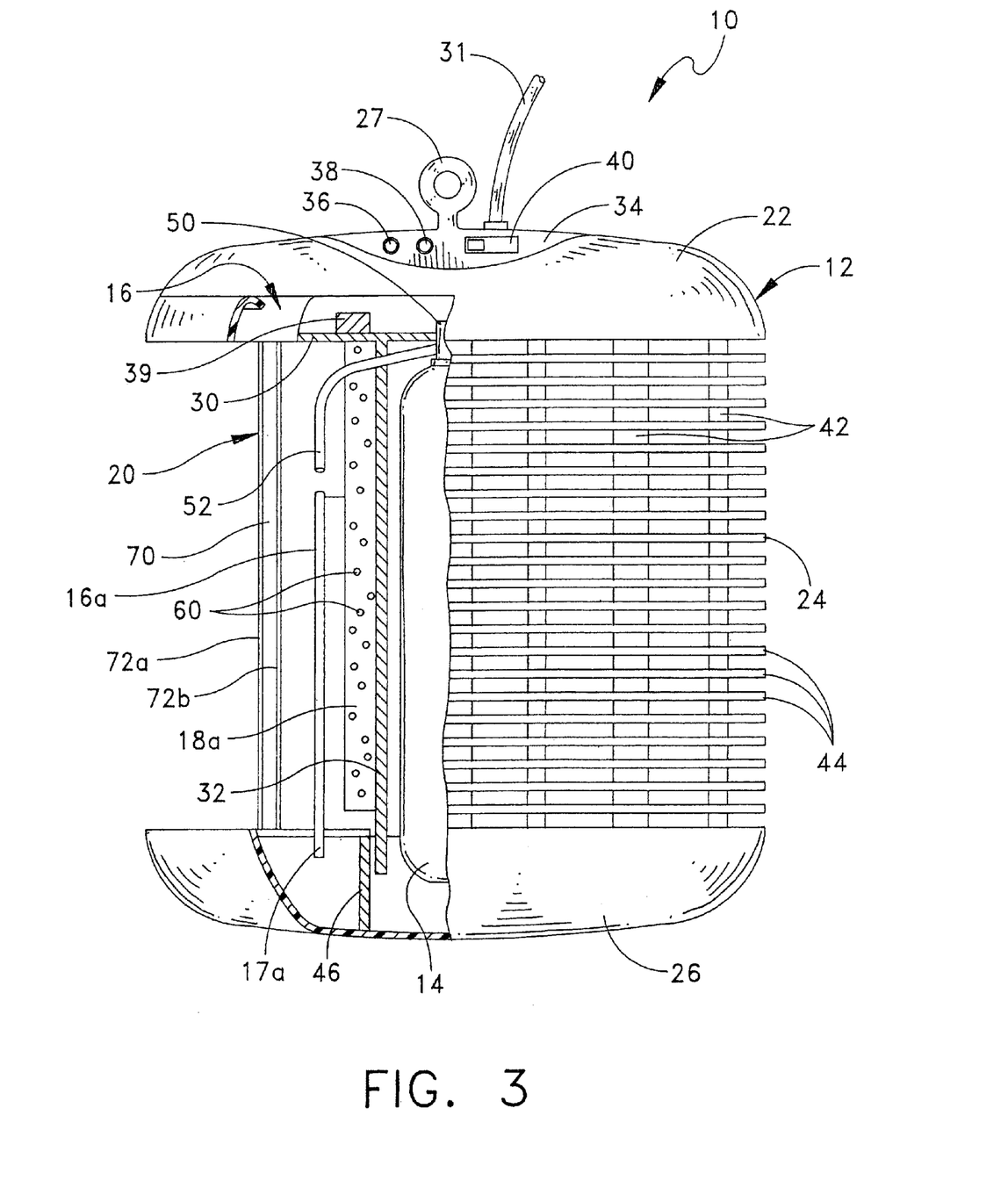
FIG. 3 is a partially cut-away side plan view of the apparatus of the present invention.
Figure 6:
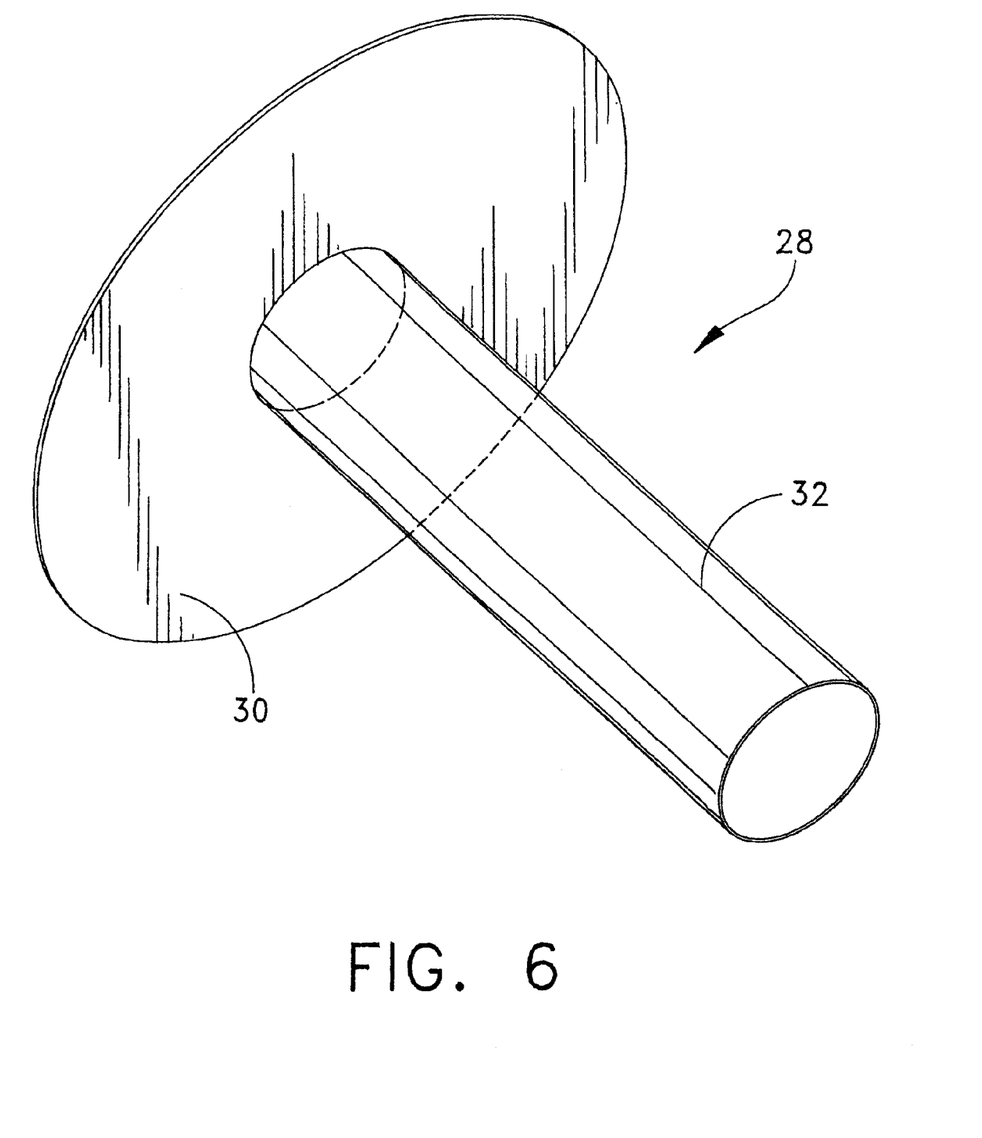
FIG. 6 is a perspective view of the chassis of the apparatus of the present invention.

As shown in FIG. 1, housing 12 includes a top cover 22, an outer protective grid 24 and a removable bottom tray 26. Housing 12 also includes a chassis 28, FIG. 6, which includes a top plate 30 and a cylinder 32 (FIGS. 3 and 6) molded together in one piece. Top cover 22 is attached to top plate 30 of chassis 28. Bottom cover 26 is removably attached to cylinder 32 of chassis 28. These components of the housing 12 are preferably fabricated from a dark colored, rigid polymeric material that is lightweight and weather resistant. As illustrated in FIG. 2, the cover 22, protective grid 24 and tray 26 are cloverleaf-shaped in plan view. The purpose of this configuration is to improve the manner in which insects encircling the apparatus 10 are destroyed. As clearly illustrated in the drawings, the housing 12 has securely mounted on its top cover 22 a hook 27 for hanging the apparatus 10 by a chain 29, for example, in an area inhabited by insects. Further provided is an electrical line 31 for supplying power from a suitable power source (e.g., an electric outlet).

The cover 22 has formed therein a control panel 34 having a power indicator light 36, status indicator lights 38 and a control switch 40 for turning the apparatus 10 on and off. The control panel 34 is in electrical communication with the power line 31 for receiving power from the power source. The cover 22, while fabricated separately from the chassis 28, is fixedly secured to the top plate 30 of chassis 28 in any suitable manner. Top plate 30 of chassis 28 is then fixedly secured to protective grid 24. The primary duty of cover 22 is to protect the internal components (e.g. canister 14, octenol source 16, heat source 18 and the electrical components interacting the same) disposed within the housing 12 from environmental contaminants, such as rain.

The protective grid 24 has a plurality of vertical support members 42, which are attached to the top plate 30 of chassis 28, interconnected with a plurality of horizontal members 44 which prevent any unwanted contact with the electric grid 20 that is positioned interiorly of the protective grid 24. Tray 26 includes an inner flange 46 extending upwardly from the bottom of tray 26. Flange 46 has a diameter slightly larger than the diameter of cylinder 32 of chassis 28, and overlaps the bottom of cylinder 32. Tray 26 may be releasably attached to cylinder 32 by means of a channel lock, in which a number of J-shaped channels 47, FIG. 4, in flange 46 interface with a corresponding number of posts (not shown) which extend perpendicularly from the outer surface of cylinder 32. The tray 26 may be removed from the apparatus 10 for removing the remains of insects destroyed by the apparatus 10 and for obtaining access to the pressurized canister 14, octenol source 16 and heat source 18.

The pressurized canister 14, source of octenol 16 and heat source 18 are suitably mounted to the chassis 28. The heat source 18 includes a blanket 18a mounted to the outer surface of cylinder 32 of chassis 28 which contains an electrically resistive heating element 60 mounted in a black flexible insulating sheet, fabricated from rubber or plastic. Such a heat source 18 is available from Electro-Flex Heat, Inc. of Bloomfield, Conn. Heating element 60 is in electrical communication with control switch 40 for turning the heat source 18 on and off. Heating element 60, when provided by power from power source 31 through switch 40, produces heat for raising the temperature of heat source 18. Heating element 60 is arranged in a pattern within blanket 18a resembling veins and arteries, to produce the infrared image of blood near the surface of the skin. Heating element 60 maintains approximately 50% to 70% of the surface area of blanket 18a at a temperature of approximately 110° F., and keeps the balance of the surface at a temperature of no less than approximately 95° F. The temperature of heat source 18 is regulated by an electrical controller (not shown), the design of which is known in the art. Heat source 18 may also include an infrared filter 19, FIG. 2, which completely surrounds blanket 18a of heat source 18. Infrared filter 19, by allowing only coherent or semi-coherent light of desired frequencies to pass through, can be used to maximize the attractiveness of the apparatus 10 for species with antennae known to be tuned to specific wavelengths of infrared light.

Figure 4:
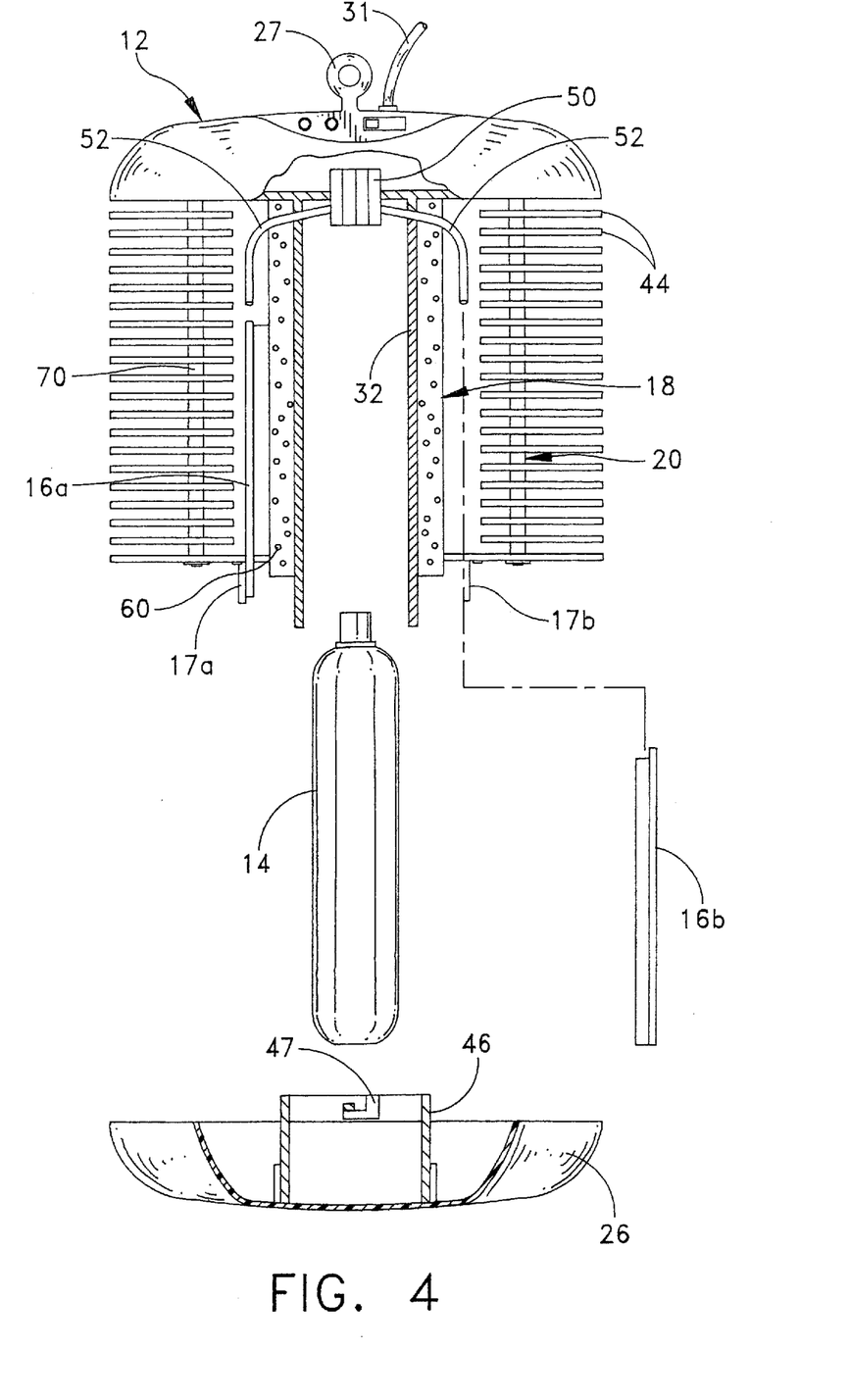
FIG. 4 is an exploded view of the apparatus of the present invention.

FIG. 4 is an exploded view of the apparatus 10, showing canister 14 and tray 26 separated from housing 12, and octenol source 16a mounted within housing 12 and octenol source 16b removed from housing 22. Octenol sources 16a and 16b include octenol dissolved in a wax-based media and contained in a plastic housing. Octenol sources 16a and 16b are mounted in contact with heat source 18, between heat source 18 and grid 20, directly below the terminal ends of discharge tubes 52 of emitter 50 (both of which are described below). Octenol sources 16a and 16b are held in place by clips 17a and 17b, which are attached to protective grid 24 in a known manner. In a preferred embodiment, each of octenol sources 16a and 16b is designed to release approximately 7mg of octenol per hour when heated at 110° F. The amount of octenol from a single octenol source 16 has been found to be extremely attractive to most species of mosquitos, whereas the amount of octenol from two octenol sources 16 has been found to be extremely attractive to most species of biting flies.

The pressurized canister 14 preferably contains carbon dioxide, and is mounted to an emitter 50, such as a solenoid valve, which controls the emission of carbon dioxide from canister 14. Emitter 50 is electronically controlled in a known manner by the same electrical controller (not shown) which controls heat source 18. Emitter 50 intermittently emits carbon dioxide from canister 14 to simulate the emission of carbon dioxide emitted through the breathing of a mammalian blood host. The carbon dioxide is emitted through a pair of discharge tubes 52, which pass through the walls of cylinder 32 and heat source 18 to transport the carbon dioxide out from cylinder 32 to an area proximate octenol source 16. Preferably, emitter 50 is a solenoid valve which is capable of emitting carbon doixide in brief puffs, which simulates the breathing pattern of most mammals, and is therefore more attractive to mosquitos than a constant emission. Such solenoid valves are available from KIP Valve of Farmington, Conn. and Precision Dynamics of New Britain, Conn. The electrical controller controls the solenoid valve to ensure that the rate of emission of carbon dioxide remains constant despite changes in the ambient temperature. An alternative to the solenoid valve is a flow restrictor, which emits a constant volume of carbon dioxide through a porous powder-metal membrane. Such a flow restrictor is available from the Mott Corporation of Farmington, Conn.

Electric grid 20 will now be described with reference to FIGS. 2–5. Electric grid 20 is formed from four panels 70 which are electrically connected together and configured to form a box which surrounds canister 14, cylinder 32, heat source 18 and octenol source 16. Each panel 70 is formed from a pair of metal plates 72a and 72b interconnected by an insulating material 74 along top and bottom edges thereof. Each plate 72a, 72b is stamped from a sheet of metal and includes a series of vertical members 82 interconnected by horizontal members 80a and 80b at the top and bottom of the panel, respectively. Insulating material 74 interconnects and separates horizontal members 80a and 80b of plates 72a and 72b. One plate 72a, 72b is electrically charged and the other 72b, 72a is connected to ground. In this manner, when insects pass through electric grid 20, they are electrocuted and destroyed.

Figure 5:
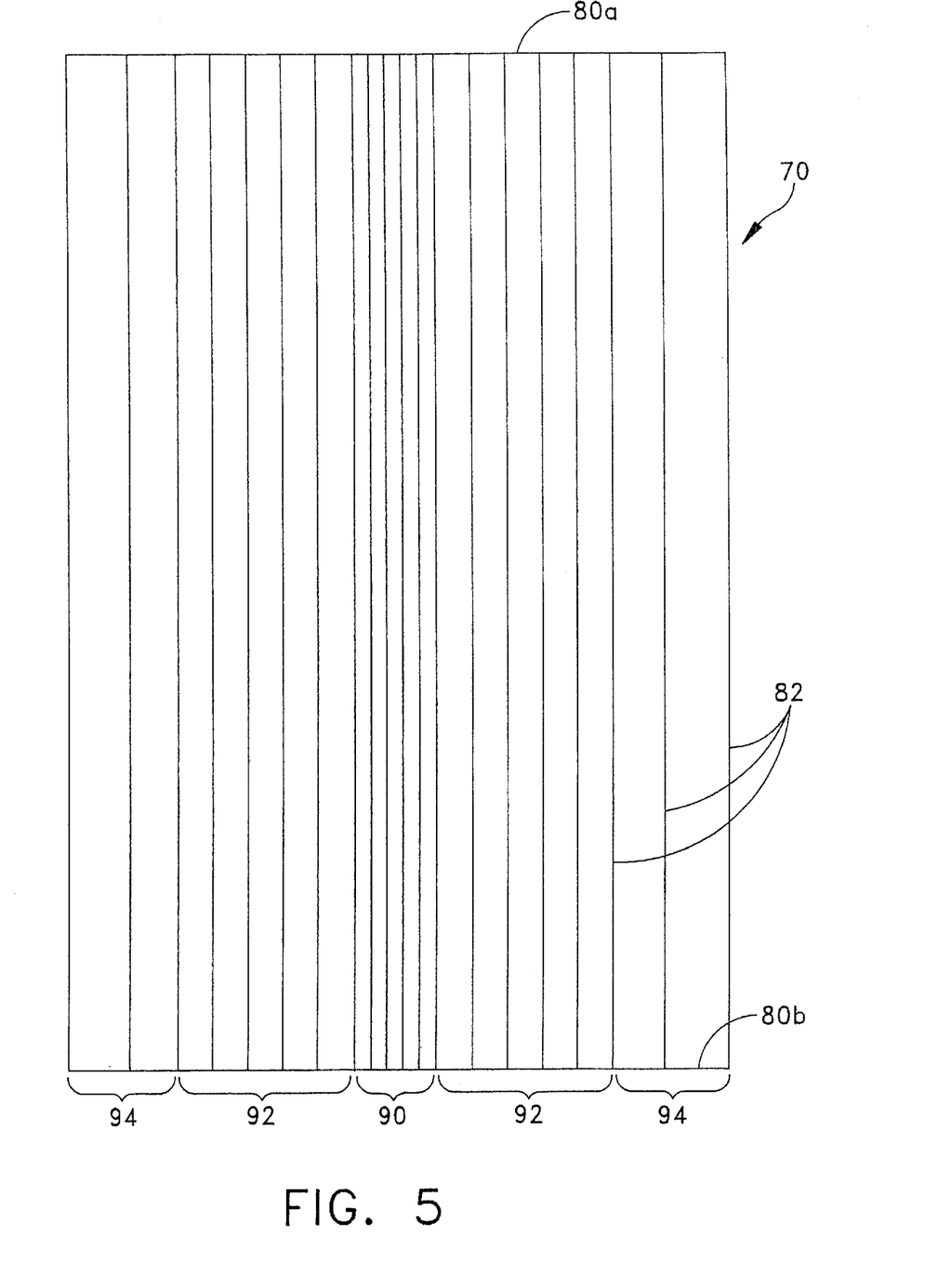
FIG. 5 is a schematic view of a panel of the electrified grid in accordance with the present invention.

As shown in FIG. 5, when plates 72a and 72b are interconnected to form panel 70, the width of the openings in the panel 70 varies according to the wingspan of the insects which are to be destroyed by apparatus 10. At area 90, the spacing between consecutive members 82 is approximately 3.0 mm to destroy midges, which have a wingspan of approximately 1.5 mm. At areas 92, the spacing between consecutive members 82 is approximately 5 mm to destroy mosquitos, which have a wingspan of approximately 5.0 mm. At areas 94, the spacing between consecutive members 82 is approximately 9.0 mm to destroy biting flies, which have a wingspan of approximately 9.0 mm. The square configuration of the electric grid around the heat source 18 places areas 90 nearest to the heat source 18, area 92 further away from heat source 18 and areas 94 furthest away from heat source 18. This configuration takes advantage of the flight paths of the particular insects, since midges are known to circle the blood host at closer range than the mosquitos, which circles the blood host at closer range than the biting flies.

Power to the electric grid 20 is supplied by a pulsed, high-voltage coil (not shown) which is controlled by the electrical controller which controls the heat source 18 and the emitter 50. Power is supplied to the electric grid 20 several times a second. There are several advantages to using such an intermittent power supply. First, expensive, continuously powered transformers are not required. Second, the insect does not have to physically contact both plates 72a, 72b of the panel 70 to be destroyed. The spacing between vertical members 82 can exceed the wingspan of the insect because the pulsed, high-voltage arc can be set to destroy an insect only when its body displaces the insulating air-gap between the vertical members 82. This design is particularly advantageous in the case of small insects such as midges. The wingspan of the midge is much less than the dry air-gap required to insulate a typical 6,500 volt transformer used in prior art insect electrocuting devices.

Another advantage to the pulsed power supply of the present invention is that, since most insects do not touch the electric grid 20 as they attempt to pass through it, they do not adhere to it, as is often the case in prior art insect electrocution devices. If they do physically contact the electric grid 20, they tend to fall away from the vertical members in the interval between the electric pulses. Furthermore, since only midges, mosquitos and biting flies are attracted to the apparatus 10, power to the electric grid 20 can be set at 2000 volts. This amount of voltage destroys the insects without exploding the exoskeleton, unlike prior art insect electrocuting devices, which, at 6,500 volts, cause the insects to explode, which sends the insect fragments into the air.

Apparatus 10 further comprises a humidity sensor 39 mounted within housing 12 on top plate 30 of chassis 28. The humidity sensor 39 is used to monitor the humidity of the ambient air and to adjust the amount of power which is supplied to electric grid 20. The humidity sensor 39 is controlled by the same electrical controller which controls the heat source 18, the emitter 50 and the high-voltage coil. Since the air gap between plates 72a and 72b is effectively shortened when the humidity of the ambient air increases, less voltage is needed to cross the gap. Therefore, the humidity sensor 39 adjusts the amount of power supplied to the electric grid 20 depending on the amount of humidity in the ambient air. As the humidity increases, the amount of power supplied to electric grid 20 is decreased proportionately, and when the humidity decreases, the amount of power supplied to the electric grid 20 is increased proportionately.

In addition to controlling the operation of the apparatus 10 as described above, the electrical controller is capable of monitoring the status of the carbon dioxide and octenol sources, and signaling when replacement of these consumables is required through status indicator lights 38 of control panel 34. The electrical controller is also capable of recording and storing in memory the number of insects which are destroyed. This information may be transmitted to monitoring stations in order to allow remote testing of insect population, etc., while limiting the exposure of test personnel to the insects and any diseases carried by the insects.

In operation, as octenol sources 16a and 16b are heated by heat source 18, in order to evaporate the octenol as described above, carbon dioxide is emitted at predetermined intervals by emitter 50, through discharge tubes 52 to an area directly above octenol sources 16a and 16b, in order to allow the evaporated octenol to mix with the carbon dioxide and thereby creating the odor which is known to be most attractive to mosquitos, biting flies and midges. First, the insects are attracted to the odor of the carbon dioxide and octenol mixture. Then, as the insects approach within visual range, they are further attracted to the small, dark-colored cylindrical shape. Finally, as the insects approach the thermal detection range, they are attracted by the thermal energy dissipated by the heat source 18. Additionally, if the apparatus 10 includes the infrared filter 19, described above, the insects are additionally attracted to the infrared light given off by heat source 18. As an insect circles the apparatus 10, it flies closer and closer to the apparatus 10, to sense the pattern of heat distribution described above. Finally, the insect flies into electric grid 20, is electrocuted and destroyed.

While there is shown and described herein certain specific structure embodying the invention, it will be manifest to those skilled in the art that various modifications and rearrangements of the parts may be made without departing from the spirit and scope of the underlying inventive concept. For example, alternative heat sources may be utilized, such as heat sources which include heating elements which are plated or sprayed directly on the cylinder 32. Therefore, the invention is not limited to the particular form herein shown and described except insofar as indicated by the scope of the appended claims.

What is claimed is:

1. An apparatus for attracting and destroying insects comprising:
    a housing including an upper housing portion, a lower housing portion and a cylinder disposed between said upper and lower housing portions;
    a heating source positioned within the housing and including a heating blanket disposed around an outer surface of said cylinder, the heating blanket having a heating element disposed within an insulating sheet and arranged in a pattern resembling veins and arteries;
    a source of insect attractant disposed adjacent said heating element, such that said insect attractant is heated by said heating element;
    a source of carbon dioxide disposed within said cylinder of said housing;
    an emitter constructed and arranged to emit said carbon dioxide proximate said insect attractant source;
    a controller constructed and arranged to control operation of said emitter so as to control emission of said carbon dioxide; and
    an insect destroying element surrounding said sources of insect attractant and carbon dioxide.

2. The apparatus of claim 1, wherein said source of insect attractant, said source of carbon dioxide, said heating source, said emitter and said insect destroying element are contained within the housing.

3. The apparatus of claim 1, wherein said emitter comprises a valve operatively coupled to a nozzle of a canister of pressurized carbon dioxide.

4. The apparatus of claim 3, wherein said housing is cloverleaf-shaped in cross-section.

5. The apparatus of claim 1, wherein said heating element is constructed and arranged to keep approximately 50%–70% of a surface area of said blanket at a temperature of approximately 110° F. so as to attract insects to said heating source.

6. The apparatus of claim 5, wherein said heating element is constructed and arranged to keep approximately 50%–70% of the surface area of said blanket at a temperature not less than approximately 95° F. so as to attract insects to the heating source.

7. The apparatus of claim 1, wherein said insect destroying element includes a grid having a plurality of electrically conductive, consecutive members arranged in at least two distinct areas, said grid being constructed and arranged to receive an electrical charge sufficient to destroy the insects.

8. The apparatus of claim 7, wherein adjacent, consecutive members are spaced a predetermined distance from each other so that an air gap is formed between the adjacent members, the spacing between adjacent members varying between the distinct areas and being sized according to a wing span of the insect to be destroyed within each area.

9. The apparatus of claim 8, wherein the at least two distinct areas includes a first area where the spacing between consecutive members is sized to destroy midges, a second area where the spacing between consecutive members is sized to destroy mosquitos, and a third area where the spacing between consecutive members is sized to destroy biting flies.

10. The apparatus of claim 9, wherein the spacing between consecutive members in the first area is approximately 3 mm, in the second area is approximately 5 mm and in the third area is approximately 9 mm.

11. The apparatus of claim 1, further comprising a sensor constructed and arranged to monitor the humidity in the ambient air around the apparatus, and wherein said controller selectively controls power supplied to said heating element in response to the sensed humidity.

12. A method of attracting and destroying insects, the method comprising the steps of:
    emitting carbon dioxide to create a carbon dioxide plume;
    heating an insect attractant proximate said carbon dioxide plume to create a mixture of carbon dioxide and said insect attractant; and
    supplying pulsed, electrical power to a grid having a plurality of electrically conductive, consecutive members arranged in at least two distinct areas, wherein adjacent, consecutive members are spaced a predetermined distance from each other so that an air gap is formed between the adjacent members, the spacing between adjacent members varying between the distinct areas and being sized according to a wing span of the insect to be destroyed within each area;

electrocuting insects as they fly toward said mixture.

13. An apparatus for attracting and destroying insects comprising:

a housing;

a source of carbon dioxide;

a source of octenol;

a heating source positioned within said housing and disposed adjacent said source of octenol, said heating source constructed and arranged to heat said octenol;

a valve constructed and arranged to emit an amount of said carbon dioxide proximate said octenol;

a grid surrounding said source of carbon dioxide, said source of octenol and said heater, said grid constructed and arranged to receive an electrical charge to destroy insects, the grid having a plurality of electrically conductive, consecutive members arranged in at least two distinct areas, wherein adjacent, consecutive members are spaced a predetermined distance from each other so that an air gap is formed between the adjacent members, the spacing between adjacent members varying between the distinct areas and being sized according to a wing span of the insect to be destroyed within each area; and a power supply constructed and arranged to supply power to electrically charge the grid.

14. The apparatus of claim 13, further comprising a controller for controlling said valve to regulate said amount of carbon dioxide emitted from said source of carbon dioxide.

15. The apparatus of claim 13, further comprising a sensor for determining an amount of humidity in the ambient air and a controller for adjusting an amount of said electrical charge based on said amount of humidity in the ambient air.

16. The apparatus of claim 13, wherein power is supplied to the grid by the power supply several times a second, such that the power which electrifies the grid is pulsed, whereby insects which enter the air gap between adjacent members are destroyed by a pulsed, high energy voltage arc, regardless of whether the insects come into direct contact with any of the electrified consecutive members.

17. The apparatus of claim 13, wherein said heating source includes a heating blanket having a heating element disposed within an insulating sheet and arranged in a pattern resembling veins and arteries.

18. The apparatus of claim 17, wherein the heating element is constructed and arranged to keep a surface temperature of the blanket at not less than approximately 95° F. so as to attract insects to the heating source.

19. An apparatus for attracting and destroying insects comprising:

a housing;

a heating source positioned within the housing and including a heating blanket having a heating element disposed within an insulating sheet;

a source of insect attractant;

a source of carbon dioxide;

an emitter constructed and arranged to emit said carbon dioxide proximate said insect attractant source;

an insect destroying element surrounding said sources of insect attractant and carbon dioxide; and a controller constructed and arranged to regulate the temperature of the heating source within a predetermined range, the controller also being constructed and arranged to control the emitter so that the rate of emission of carbon dioxide remains constant at various ambient temperatures.

20. The apparatus of claim 19, wherein the insect destroying element includes a grid having a plurality of electrically conductive, consecutive members spaced from each other and arranged in at least two distinct areas, the grid being constructed and arranged to receive a pulsed, electrical charge from a power supply sufficient to destroy the insects regardless of whether the insects come into direct contact with the consecutive members.

21. The apparatus of claim 20, wherein the controller is also constructed and arranged to control the pulsed electrical charge received by the grid.

22. The apparatus of claim 19, wherein the controller is also constructed and arranged to record the number of insects which are destroyed by the apparatus, and to transmit the recorded data.

23. The apparatus of claim 19, wherein the controller is also constructed and arranged to monitor the status of the source of insect attractant and carbon dioxide.

24. An apparatus for attracting and destroying insects comprising:

a housing;

a heating source positioned within the housing and including a heating blanket having a heating element disposed within an insulating sheet and arranged in a pattern resembling veins and arteries, the heating element being constructed and arranged to keep a surface temperature of the blanket at not less than approximately 95° F., so as to attract insects to the heating source;

a source of insect attractant;

a source of carbon dioxide;

an emitter constructed and arranged to emit said carbon dioxide proximate said insect attractant source;

a grid constructed and arranged to receive an electrical charge to destroy insects, the grid having a plurality of electrically conductive, consecutive members arranged in at least two distinct areas, wherein adjacent, consecutive members are spaced a predetermined distance from each other so that an air gap is formed between the adjacent members, the spacing between adjacent members varying between the distinct areas and being sized according to a wing span of the insect to be destroyed within each area; and a power supply constructed and arranged to supply power to electrify the grid several times a second such that the power used to electrify the grid is pulsed, wherein insects which enter the spacing between adjacent members are destroyed by a pulsed, high energy voltage arc, regardless of whether the insects come into direct contact with any of the electrified consecutive members.

* * * * *